United States Patent [19]
Parodi et al.

[11] Patent Number: 5,326,833
[45] Date of Patent: Jul. 5, 1994

[54] LIQUID REACTIVE COMPOSITIONS COMPRISING POLYISOCYANATES, EPOXIDES AND SOLUTIONS OF ALKALI METAL HALIDES IN POLYOXYALKYLENIC COMPOUNDS

[75] Inventors: Fabrizio Parodi, Genoa; Carla Zannoni, Milan, both of Italy

[73] Assignee: ENICHEM S.p.A., Milan, Italy

[21] Appl. No.: 981,426

[22] Filed: Nov. 25, 1992

[30] Foreign Application Priority Data

Nov. 26, 1991 [IT] Italy .................. MI91-A-003160

[51] Int. Cl.$^5$ ............... C08G 18/22; C08G 18/58; C08G 59/30; C08G 59/40; C08F 283/10; C08F 4/08; C08L 63/02
[52] U.S. Cl. ...................... 525/528; 528/57; 528/73
[58] Field of Search ............ 528/57, 73; 525/528

[56] References Cited
U.S. PATENT DOCUMENTS

| | | | |
|---|---|---|---|
| 3,020,262 | 2/1962 | Speranza | 528/57 |
| 3,334,110 | 8/1967 | Schramm | 525/528 |
| 3,494,888 | 2/1970 | McElroy | 525/528 |
| 4,080,345 | 3/1978 | Riemhofer | . |

FOREIGN PATENT DOCUMENTS 0454207 10/1991 European Pat. Off. .
1595408 4/1970 Fed. Rep. of Germany .
2542489 4/1976 Fed. Rep. of Germany .

OTHER PUBLICATIONS

Chemical Abstracts, vol. 74, No. 6, Feb. 8, 1971, AN 23151s, Yokoyama, et al., "Synthesis of Polyoxazolidones Containing Phosphorous from Phenylphosphonic Diisocyanate with Glycidyl Ethers".

*Primary Examiner*—John C. Bleutge
*Assistant Examiner*—D. R. Wilson
*Attorney, Agent, or Firm*—Oblon, Spivak, McClelland, Maier & Neustadt

[57] ABSTRACT

Reactive compositions liquid at a temperature lower than 70° C., comprising: A) at least one organic polyisocyanate; B) a mono- or poly-epoxide, or a mixture of different mono- and/or poly-epoxides: C) a catalyst, liquid at a temperature lower than 70° C., consisting of a solution of at least one alkali metal halide in a polyoxyalkylenic compound or in a mixture of different polyoxyalkylenic compounds, said polyoxyalkylenic compound containing at least one hydroxyl group of alcoholic type. These reactive compositions are able to gel and solidify rapidly at temperatures between 0° and 70° C., to form a glassy polymer of high softening point.

23 Claims, No Drawings

LIQUID REACTIVE COMPOSITIONS COMPRISING POLYISOCYANATES, EPOXIDES AND SOLUTIONS OF ALKALI METAL HALIDES IN POLYOXYALKYLENIC COMPOUNDS

This invention relates to reactive compositions based on polyisocyanates and epoxides. More particularly, the invention relates to polyisocyanate- and epoxide-based reactive compositions liquid at a temperature of less than 70° C. and containing alkali metal halides dissolved in polyoxyalkylenic compounds, which polymerize rapidly at a temperature of between 0° and 70° C. to transform into glassy polymeric material of high softening point. In the thermosetting resin sector it is well known that polymers containing isocyanurate chemical structures preparable by polymerizing polyisocyanates, and polymers containing 2-oxazolidone or jointly isocyanurate and 2-oxazolidone structures preparable by polymerizing mixtures of polyisocyanates with mono- or poly-epoxides, are of industrial interest because of their thermal stability, hydrolytic stability and high glass transition temperature which these isocyanurate and 2-oxazolidone structures confer.

Polymers of this type can therefore be usefully applied to the manufacture of articles or their parts, the formation of surface protective and/or decorative coatings, adhesives, sealants or polymer foams for which high softening points and low deformability under load in hot conditions are required, together with good chemical stability towards heat and/or in hydrolyrically aggressive environments.

It is also well known that the polymerization of liquid mixtures of di- or poly-isocyanates and mono- or poly-epoxides can be promoted by suitable catalysts such as tertiary amines, quaternary ammonium salts, and tetraalkylphosphonium halides. In this respect, reference should be made for example to German patents 3,323,084, 3,323,122, 3,323,123, 3,323,153, 3,600,767 and 3,644,382, or to U.S. Pat. Nos. 3,687,897 and 4,742,142.

Other known catalysts for this use are various metal halides such as aluminum chloride, magnesium chloride, zinc chloride, ferric chloride and lithium chloride, generally introduced into the polyisocyanate and epoxide mixtures as complexes with compounds such as hexamethylphosphoryltriamide, triphenylphosphine oxide, tetrahydrofuran, N,N-dimethyl-formamide and N,N-dimethyl-acetamide. Catalyst systems of this type are described for example in German patents 2,318,823 and 2,542,489, or in European patent application 342,064 and Japanese patent application 76-74,095.

According to the aforedescribed methods of the known art, polymerization of mixtures comprising polyisocyanates, polyepoxides and a suitable catalyst is achieved, with consequent gelation and hardening, by heating to a temperature within the range of 60°–150° C., and preferably within the range of 80°–130° C.

The polymerization is then generally led to completion by prolonged after-treatment of the solidified material at a temperature higher than 150° C.

The compositions of the known art are not however free from drawbacks, particularly related to the catalyst systems used. The following are some examples of these:

the polymerization is performed for a relatively long time (one hour or more) and/or by heating to and maintaining at high temperature;

the tertiary amines can be inactivated by contact with air because of their carbonation and/or oxidation;

there is generally slow and/or difficult solubilization both of the quaternary ammonium or phosphonium salts and of said metal halides, which are notoriously solid, sometimes melt at high temperature and are generally poorly soluble in organic solvents and resins;

the aforesaid metal halides and their complexes are extremely hygroscopic, if not indeed deliquescent or rapidly decomposable by atmospheric moisture (such as in the case of aluminium chloride), to the extent of being difficult to handle or corrosive;

the complexing agents used with the above halides give rise to solid complexes (such as triphenylphosphine oxide), or are extremely harmful (such as hexamethylphosphoryltriamide) or are highly volatile and flammable (such as tetrahydrofuran). In addition, in most cases these complexing agents are liquids which remain free in the system even when polymerization has taken place (such as tetrahydrofuran), and because of their volatility at the material processing temperature lead to the formation of undesirable bubbles or foam. Finally, they can even react under hot conditions with the isocyanates of the system to form gas (such as carbon dioxide with dimethylformamide or dimethyl-acetamide).

In the manufacture of polymer articles by polymerizing thermosetting resins, and in particular composite materials obtained by polymerizing thermosetting resins in which reinforcement fibres and/or mineral powders are distributed or dispersed, it is known to be of considerable interest to find methods based on rapid forced mixing of liquid reagents, catalysts and possible miscellaneous additives, injection or suction of the resultant liquid reactive composition into a closed mould containing or not containing reinforcing fibres in various configurations or arrangements, rapid gelation and solidification of the composition within the mould, and then rapid extraction of the solid article from the mould itself.

Methods of this type are already known to the expert of the art, and include for example the so-called Resin Transfer Moulding, High Speed Resin Transfer Moulding, Resin Injection Moulding, Liquid Injection Moulding, Reaction Injection Moulding and the like. Reference may be made for example to the publication "Resin transfer moulding of aerospace resins—A review", by F. C. Robertson, *British Polymer Journal*, vol. 20, pp 417–429 (1988).

Methods of the aforesaid type enable finished articles of even considerable dimensions to be manufactured quickly, automatically and economically, with good article dimension, thickness and constitution control by virtue of the constraints represented by the precise fixed dimensions of the cavities in the forming moulds and the exactly and reproducibly predeterminable type, quantity and geometrical arrangement of the resins, fibres and/or mineral additives introduced into the moulds.

Thermosetting resins suitable for these methods must have very short overall gelation and hardening times, of the order of minutes or at most a few tens of minutes, to allow handling of the solidified articles and their extraction from the forming moulds after a short time. This means that the moulds are occupied only briefly and are quickly usable for the next forming operation. The chemical polymerization of the material already rapidly solidified in the mould can in this respect be completed under heating in a separate location after its extraction from the mould.

The chemical gelation and hardening processes can be accelerated by strong heating of the thermosetting resin or by using highly active polymerization catalysts.

An important limitation to the use of rapid manufacturing methods of the aforesaid type is the well known strong exothermicity typical of the polymerization of thermosetting resins in general. Strong heating of the resin for suitably accelerating its gelation and hardening followed by further temperature increase caused by the exothermicity of the chemical polymerization process tends to result in considerable overheating of the material, with the possibility of thermal degradation of the polymer, of the additives contained in it, such as mould-release agents or dispersants, or of inserts encapsulated within it, to the extent of vaporization of components of the material with the formation of foam or cavities. Limiting this overheating is particularly difficult because the heat of reaction is difficult to remove from the outside due to the rapidity of the chemical process and the resultant rapidity of heat generation.

Similar considerations are valid for reactive compositions which can be converted into polymers by fast polymerization processes and are suitable for manufacturing articles by casting into open moulds or by distribution over shapes, for forming surface coatings or as adhesives, sealants or polymer foams, especially if applied in considerable thickness. Again in such cases the use of high temperature to cause rapid gelation and hardening of the material, or of prolonged heating before the material has solidified, or the generation of overheating deriving from the exothermicity of the chemical polymerization process can cause thermal degradation of the polymer, of the additives contained in it or bodies or surfaces in contact with it, or, especially if the material is still in the liquid or plastic state and if it has free surfaces exposed to the air, can cause emission of flammable, toxic or otherwise harmful vapours of chemical compounds into the working environment.

It has now been found that by using polymerization catalysts in the form of solutions of alkali metal halides in polyoxyalkylenic compounds, liquid and only slightly viscous reactive compositions based on polyisocyanates and epoxides can be obtained which, without any of the aforesaid drawbacks, are able to gel and solidify rapidly and spontaneously at temperatures between 0° and 70° C., to convert into a glassy material of high softening point. The hardening of these materials can then be completed by heating them for a relatively short time.

The present invention therefore provides reactive compositions liquid at a temperature of less than 70° C., comprising:

A) at least one organic polyisocyanate;
B) a mono- or poly-epoxide, or a mixture of different mono- and/or poly-epoxides;
C) a catalyst, liquid at a temperature of less than 70° C., consisting of a solution of at least one alkali metal halide in a polyoxyalkylenic compound or in a mixture of different polyoxyalkylenic compounds, said polyoxyalkylenic compound containing at least one hydroxyl group of alcoholic type.

Organic polyisocyanates suitable for use as component A in the aforesaid compositions are those pertaining to the family of compounds of general formula Q(NCO)$_m$, where m is an integer number greater than 1 and preferably equal to 2, 3 or 4, and Q is an m-valent $C_6$-$C_{24}$ organic radical of aliphatic, cycloaliphatic, aromatic, heterocyclic or mixed aliphatic, cycloaliphatic, aromatic and/or heterocyclic type. Numerous diisocyanates of this type are reported for example in the publication "Diisocyanates" by A. A. R. Sayigh, H. Ulrich and W. J. Farissey Jr., in "Condensation Monomers", edited by J. K. Stille and T. W. Campbell, Wiley-Interscience, New York, 1972, pages 369–476. The said organic radical Q can also include heteroatoms not forming part of cyclic structures, and/or functional groups or various chemical bonds containing or not containing heteroatoms, such as ether, thioether, ester, carbonyl, sulphonyl, amide, carbodiimide, urethane, allophanate or biuret groups, olefinic double bonds, acetylenic triple bonds etc.

In a preferred embodiment, polyisocyanates liquid at a temperature of less than 70° C., and preferably liquid at a temperature of less than 20° C., are advantageously used. Mixtures of different polyisocyanates, and of such mixtures those which are liquid at a temperature of less than 70° C. and preferably at less than 20° C., can also be advantageously used.

According to the present invention polyisocyanates are preferably used chosen from the group comprising aromatic polyisocyanates and mixtures thereof. Such polyisocyanates and their mixtures include toluene-2,4- and -2,6-diisocyanate and mixtures thereof, diphenylmethane-4,4'-, -2,4'and -2,2'-diisocyanate and mixtures thereof, naphthalene-1,5-diisocyanate, 1,4-phenylenediisocyanate, 3,3'-dimethyldiphenyl-4,4'-diisocyanate, diphenyl-ether-4,4-diisocyanate and triphenylmethane-4,4', 4''-triisocyanate. Other advantageously usable aromatic polyisocyanates are the polyphenylmethylene-polyisocyanates obtainable by phosgenation of the condensation products of aniline with formaldehyde.

Modified aromatic polyisocyanates which can be advantageously used include the isocyanic adducts obtainable by reacting one mole of at least one $C_2$-$C_{30}$ polyol containing p alcoholic hydroxyls, where p is 2, 3 or 4, with p moles of at least one aromatic polyisocyanate containing m isocyanate groups, preferably chosen from the aforestated ones. Polyols which can be used include for example ethylene glycol, diethylene glycol, triethylene glycol, tetraethylene glycol, propylene glycol, dipropylene glycol, tripropylene glycol, 1,3- and 1,4-butanediol, 1,5-pentanediol, 1,6-hexanediol, the trimethyl-1,6-hexanediols, glycerol, 1,1,1-trimethylolpropane, 1,1,1-trimethylolethane and mixtures thereof. Those preferably used are the isocyanic adducts or mixtures of different isocyanic adducts which are liquid at a temperature of less than 70° C. and preferably at a temperature of less than 20° C. Examples of such isocyanic adducts which can be advantageously used are those adducts liquid at room temperature of aromatic isocyanates which are solid at room temperature, such as those obtainable by reacting diphenylmethane-4,4'-diisocyanate with dipropyleneglycol or triethyleneglycol.

Other aromatic polyisocyanates which can be usefully used are isocyanic prepolymers or mixtures of different isocyanic prepolymers obtainable by reacting at least one aromatic polyisocyanate from the aforelisted with at least one polymer polyol of average molecular weight preferably between 200 and 15,000. These isocyanic prepolymers can be obtained by reacting quantities of aromatic polyisocyanate with said polyol such that the molar ratio of the isocyanate group to the alcoholic hydroxyl group is equal to or greater than 2. Suitable polymer polyols are polyoxyalkylene diols, such as polyoxyethyleneglycol, polyoxypropyleneglycol, polyoxytetramethyleneglycol, polyoxyhexamethyleneglycol and the corresponding mixed polyoxyalkylene diols.

Other suitable polymer polyols are those obtainable by mono- or poly-oxyalkylenation of various non-polymeric polyols with alkylene oxides such as ethylene oxide, propylene oxide, tetrahydrofuran, isobutylene oxide or mixtures thereof, examples of such polymer polyols being 1,1,1-trimethylolpropane polypropoxylate, glycerol mono- or poly-propoxylate, sorbitol polypropoxylate and pentaerythritol polypropoxylate. Other polymer polyols usable are polyesters with 2 or more alcoholic hydroxyls at the ends of the molecule and an average molecular weight preferably of between 400 and 10,000, such as those obtainable by polycondensation of a polycarboxylic acid or a mixture of different polycarboxylic acids, preferably dicarboxylic, with a polyol or mixture of different polyols, preferably diols, such that the ratio in equivalents of alcoholic hydroxyl to carboxyl is greater than 1. Suitable polyhydroxyl-functional polyesters are also those likewise obtainable from suitable mixtures of polyols and carboxylic hydroxyacids or from mixtures of polyols, carboxylic hydroxyacids and polycarboxylic acids, preferably those obtainable from diols, monohydroxy-monocarboxylic acids and dicarboxylic acids.

Other analogous polyols are polyhydroxyl-functional polyesters, preferably polyester-diols and -triols, obtainable by polymerizing lactones such as $\epsilon$-butyrolactone, $\epsilon$-caprolactone or others or their mixtures, the polymerization being initiated by a suitable quantity of a non-polymeric polyol, preferably a diol or triol. Further polymer polyols suitable for preparing isocyanic prepolymers include other polymers in general with 2 or more alcoholic hydroxyls such as polybutadienes or polyisoprenes, or copolymers of butadiene and isoprene having terminal and/or lateral alcoholic hydroxyls, and polymers obtainable by copolymerizing vinyl compounds, such as acrylonitrile, vinylchloride, styrene and others either alone or in mixture, with at least one vinyl compound containing an alcoholic hydroxyl, such as a hydroxyalkyl-acrylate or -methacrylate, a hydroxyalkyl-styrene or others.

The aforesaid isocyanic prepolymers and the adducts can be used either alone or mixed with the aforedescribed aromatic polyisocyanates.

According to the present invention it is generally preferable to use commonly available commercial aromatic polyisocyanates which are easy to obtain and are liquid at temperatures not exceeding 40° C. Isocyanates of this type include for example toluene-2,4- and -2,6-diisocyanate and mixtures of these isomers, and in particular the 80:20 ratio of the two stated 2,4 and 2,6 isomers which is currently available commercially, diphenylmethane-4,4'-diisocyanate (or MDI) and mixtures of this with the corresponding diphenylmethane-2,4'- and 2,2'-diisocyanate. Commercial aromatic polyisocyanates of the stated type which can be used particularly advantageously in the present invention also include the products obtainable by phosgenation of aromatic polyamines deriving from the condensation of aniline with formaldehyde in various ratios and by various condensation methods. The isocyanates obtained in this manner, and commonly known as "crude" MDI, consist of more or less complex mixtures comprising mainly diphenylmethane-4,4'-, -2,4'- and -2,2'-diisocyanate together with other of their isomers and various polyphenylmethylene-polyisocyanates in variable ratios. Mixtures of said type can additionally comprise isocyanates containing carbodiimide groups deriving from condensation of the same isocyanates, and/or isocyanic adducts of said carbodiimide compounds with the isocyanates themselves. Other polyisocyanates usable with particular advantages are the various mixtures of diphenylmethane-2,4'- and -4,4'-diisocyanate obtainable by distilling the aforesaid phosgenation products, and the residues of this distillation, which are particularly rich in polyphenylmethylene-polyisocyanates.

Use can also be made of the distillation residues, consisting of complex mixtures of compounds containing isocyanate groups and recoverable from the preparation of commercial aromatic di- and poly-isocyanates in general and different from the aforesaid polyisocyanates of the diphenylmethane family, such as the distillation residues of toluene-diisocyanate and others of the initially stated aromatic polyisocyanates.

The component B forming part of the reactive composition of the present invention consists of a monoepoxide or preferably a polyepoxide, or a mixture of different poly- and/or mono-epoxides. Said epoxides are aliphatic, cycloaliphatic, aromatic, heterocyclic or mixed-structure organic compounds, the ends of their molecule bearing epoxide groups in a number equal to or greater than 1 and preferably equal to or greater than 2. Numerous di- and poly-epoxides of the indicated type are reported for example in the publications:

a) "Handbook of Epoxy Resins", by H. Lee and K. Neville, McGraw-Hill, New York, 1967 (or anastatic reprint of 1982), pages 4–36 to 4–70;

b) "Epoxy Resins. New results and developments", by F. Lohse. Die Makromoleculare Chemie, *Macromolecular Symposia*. vol. 7, pages 1–16 (1987).

The di- and poly-epoxides which can be used include the diglycidylethers of bisphenols and polyvalent phenols such as 2,2-bis(4-hydroxyphenyl)propane (or bisphenol A), 4,4'-di-hydroxydiphenylmethane (or bisphenol F) and its isomers, 4-4'-dihydroxydiphenylether, 4,4'-dihydroxy-diphenylsulphone (or bisphenol S), hydroquinone and hydroquinones with various substituents on the benzene ring, resorcin, pyrocatechol, floroglucinol, methylfloroglucinol, 1,1,3-tris(4-hydroxyphenyl) propane, tris(4-hydroxyphenyl)methane, 2,2',4,4'-tetrahydroxy-diphenyl, chlorinated or brominated bisphenols such as 2,2-bis(4-hydroxy-3,5-dichlorophenyl)-propane (or tetrachloro-bisphenol A) and 2,2-bis(4-hydroxy-3,5-dibromophenyl)propane (or tetrabromobisphenol A), and the polyglycidylethers of novolacs obtainable by polycondensation, in particular acid-catalyzed, of phenols with aldehydes, such as the phenol-formaldehyde and orthocresol-formaldehyde novolacs.

Other usable polyepoxides include the polyglycidyl esters of aliphatic, cycloaliphatic, aromatic and mixed-structure polycarboxylic acids such as adipic acid, dimer and trimer linoleic acid, hexahydrophthalic acid, methylhexahydrophthalic acid, 1,4-cyclohexanedioic acid, phthalic acid, isophthalic acid and the polyglycidyl esters of polycarboxylic acids obtainable by reacting 1 mole of a polyol having m hydroxyl groups with m moles of a cycloaliphatic or aromatic anhydride, such as those deriving from 1 mole of 1,4-cyclohexanediol and 2 moles of hexahydrophthalic anhydride, from 1 mole of 1,1,1-trimethylol-propane and 3 moles of hexahydrophthalic anhydride, or from 1 mole of pentaerythritol and 4 moles of hexahydrophthalic anhydride, or the polyglycidyl(ether-esters) of carboxylic hydroxyacids such as 4,4-bis(4-hydroxyphenyl)-valeric acid.

Usable polyepoxides also include those obtainable by N-alkylation of aromatic amines, or N-alkylation and etherification of aminophenols, with epichlorohydrin. Polyepoxides of this type include N,N- glycidyl-lanilin, N,N,N',N'-tetraglycidyl-4,4'-di-aminodiphenylmethane, N,N,N',N'-tetraglycidyl-4,4'-diaminodiphenylsulphone, and N, ,N'-diglycidyl-4-glycidoxyaniline. N-glycidylamides such as N,N'-diglycidyloxamide can also be used, as can various polyepoxides containing heterocyclic structures such as triglycidylisocyanurate, 1,2,4-triglycidyl-1,2,4-triazolinedione, polyglycidyl-1,3-bis(3-hydantoinyl)-2-hydroxypropane, and poly(2-alkyl-glycidyl)ethers, in particular the poly(2-methyl-glycidyl)ethers, of bisphenols and polyvalent phenols such as the bis(2-methylglycidyl)ether of bisphenol A. Usable polyepoxides also include those obtainable for example by reacting a diepoxide with a bisphenol in a variable diepoxide/bisphenol molar ratio exceeding 1 but not greater than 2, and having an average molecular weight and an epoxide equivalent weight which increases as the ratio of the moles of diepoxide to the moles of bisphenol put to react decreases from 2 towards 1. Diepoxides of this type include the "higher homologues" of the diglycidylether of bisphenol A, of chemical constitution:

polymers of these with other vinyl monomers such as styrene, alphamethylstyrene, vinylacetate, and alkyl acrylates and methacrylates.

Analogously to that stated for the polyisocyanates, in a preferred embodiment epoxides liquid at a temperature of less than 70° C. and preferably at less than 20° C. can be advantageously used. Mixtures of different polyepoxides can also be advantageously used, and of such mixtures preferably those which are liquid at a temperature of less than 70° C. and preferably at less than 20° C.

According to the present invention monoepoxides preferably liquid at room temperature can also be used, preferably in mixture with polyepoxides of the aforedescribed types. Said monoepoxides include the glycidylethers of alcohols such as butanol, heptanol, octanol, 2-ethylhexanol, allyl alcohol and the glycidylethers of phenols such as phenol, paracresol, para-tertbutylphenol and nonylphenol.

The catalyst C consists of at least one alkali metal halide dissolved in a polyoxyalkylenic compound, or a mixture of different polyoxyalkylenic compounds, containing at least one hydroxyl group of alcohol type.

The halide is preferably a bromide or iodide, and the alkali metal is preferably chosen from sodium, potassium, rubidium and cesium.

The polyoxyalkylenic compounds usable in the present invention are liquid and generally only slightly viscous at a temperature of between −50° and 70° C., and preferably between −10° and 25° C. They comprise repetitive oxyalkylenic units containing 2–4 carbon atoms, preferably chosen from:

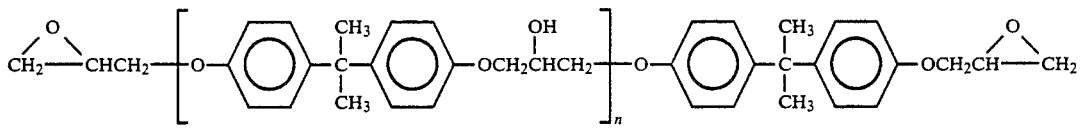

and mixtures of different types thereof, available commercially with an average value of n varying from about 0.2 to about 30, and the corresponding "higher homologue" diepoxides of the diglycidyl ether of bisphenol F. Other usable polyepoxides are the polyglycidylethers of polyols such as 1,4-butanediol, 1,6-hexanediol, neopentylglycol, 1,4-dimethylolcyclohexane, 2,2-bis(4-hydroxy-cyclohexyl)propane (or hydrogenated bisphenol A), polypropylene glycol, glycerol, 1,1,1-trimethylolpropane, pentaerythritol and castor oil.

Other usable polyepoxides are those obtainable by polyepoxidation, for example with peracids, of compounds containing 2 or more olefinic double bonds such as butadiene, 1,5-cyclooctadiene, 1,5,9-cyclododecatriene, dicyclopentadiene, 3-vinylcyclohexene, divinylbenzene, 4,4'-diallyldiphenylether, 2,2-bis(4-allyl-cyclohexyl)propane, polyunsaturated olefins containing 2 or more cyclohexene or cyclopentene rings joined by single or multiple atom bridges such as bis(2-cyclopentenyl)ether, 2-(3-cyclo-hexenyl)-5,5-spiro-cyclohex-3-ene-metadioxane, 3-cyclohexenyl-methyl-3-cyclohexenoate, bis(3-cyclohexenylmethyl)adipate, esters of polyols with unsaturated carboxylic acids such as many vegetable oils, polymers and copolymers containing olefinic double bonds such as polybutadiene, polyisoprene and their copolymers with other vinyl monomers such as styrene, and unsaturated polyesters. Polymers containing epoxide groups obtainable from vinyl-glycidyl monomers can also be used, such as glycidylacrylate, glycidylmethacrylate, allylglycidylether and co-

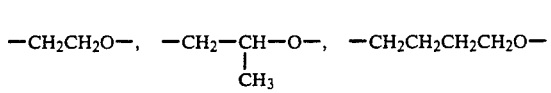

These polyoxyalkylenic compounds can comprise both homo-polyoxyalkylenic and co-polyoxyalkylenic structures in which the various units are distributed randomly or in blocks. Homo- and co-polyoxyalkylenediols form part of this class of compounds. The former comprise in particular:

polyoxyethyleneglycols of average molecular weight between about 150 and 10000, and preferably between about 200 and 600;

polyoxyopropyleneglycols of average molecular weight between about 200 and 6000. and preferably between about 200 and 750;

polyoxytetramethyleneglycols of average molecular weight between about 200 and 3000, and preferably between about 200 and 650.

Co-polyoxyalkylenediols usable in the present invention include in particular the three-block copolymers obtained by polyethoxylation of polyoxypropyleneglycols of various molecular weights, generally not exceeding 5000, which are commercially available as surfactants for various industrial and civil uses. The molecular ratio of oxypropylene units to oxyethylene units can vary within a wide range, for the purposes of the present invention the average molecular weight being preferably less than 1500.

Three-block copolymer analogues obtained by polyethoxylation of polyoxytetramethyleneglycols of various molecular weights can also be used.

Polyoxyalkylenic compounds usable according to the present invention also include the products obtainable by polyoxyalkylenation or co-polyoxyalkylenation of functional compounds containing one or more groups chosen from alcoholic or phenolic hydroxyls, carboxyl groups, primary or secondary amide groups of carboxylic acids, or primary or secondary amine groups. According to the present invention the following are particularly usable:

the polyethoxylation products of said functional compounds containing between 3 and 200 and preferably between 5 and 25 oxyethylenic units per molecule;

the polypropoxylation products of said functional compounds containing between 3 and 100 and preferably between 3 and 25 oxypropylenic units per molecule;

the products obtained by polyethoxylation followed by polypropoxylation of said functional compounds containing between 3 and 150 and preferably between 5 and 25 oxyalkylenic units per molecule.

These polyoxyalkylenation or co-polyoxyalkylenation products particularly include the polyoxyalkyleneglycol monoethers obtained by polyoxyalkylenation, and preferably by polyethoxylation or polypropoxylation of monovalent alcohols or phenols or polyvalent alcohols or phenols.

The preferred monovalent alcohols usable for this purpose are those, saturated or unsaturated, containing from 1 to 30 carbon atoms such as methyl, ethyl, propyl, isopropyl, allyl, butyl, sec-butyl, tert-butyl or isobutyl alcohol, amyl alcohols, n-hexyl, n-octyl, 2-ethylhexyl, n-decyl, n-undecyl, n-dodecyl, n-tridecyl, n-tetradecyl, n-hexadecyl, oleyl, stearyl or tetrahydrofurfuryl alcohol, cyclohexanol, methyl-cyclohexanols, monooctyl- and monononyl-cyclohexanols, benzyl alcohol and others, or their mixtures.

The preferred polyvalent alcohols are those with between 2 and 30 carbon atoms, such as 1,1,1-trimethylol-propane, 1,1,1-trimethylol-ethane, glycerol, pentaerythritol, sorbitol, mannitol, di-, tri-, tetra-, penta-, hexa-, or hepta-pentaerythritol etc. Various other polyhydroxyl compounds can also be used, in particular sugars such as glucose, fructose and saccharose, and mono- and di-glycerides of saturated or unsaturated fatty acids such as those obtainable by partial saponification of natural oils and fats.

Monovalent phenols include those with between 6 and 30 carbon atoms. Advantageously usable are phenol and the monoalkylphenols, such as p-(tert-butyl)phenol, p-(n-octyl)phenol, p-(n-nonyl) phenol, p-(iso-octyl)-phenol or p-(tetramethylbutyl)phenol, from which polyoxyalkyleneglycol monoalkylarylethers are obtained by polyoxyalkylenation.

Other polyoxyalkylenic compounds which can be usefully used in the present invention are those obtained by polyoxyalkylenation of the above alcohols or phenols. For example, the previously described polyvalent alcohols can be subjected firstly to polyethoxylation and then to polypropoxylation, to obtain structures which include both polyoxyethylenic and polyoxypropylenic blocks.

According to the present invention, the products obtained by polyoxyalkylenation, preferably polyethoxylation, of carboxylic acids or the related amides can also be used. Preferably used are saturated, unsaturated or polyunsaturated aliphatic monocarboxylic acids or their mixtures containing from 1 to 30 carbon atoms, or the corresponding amides.

Said monocarboxylic acids include lauric, n-tridecanoic, myristic, stearic, palmitic, arachic, oleic, linoleic, linolenic and ricinoleic acid, carboxylic acid mixtures deriving from the saponification of vegetable or animal oils and fats, and natural waxes and resins such as coconut oil, soybeen oil, palm nut oil, tallow, rosin, dehydrogenated rosin, rosin oil and others.

Other polyoxyalkylenic compounds suitable for use in the present invention are the polyoxyalkylenation, preferably polyethoxylation, products of primary or secondary amines or polyamines, or their mixtures. Of these, those advantageously usable are saturated, unsaturated or polyunsaturated primary or secondary aliphatic monoamines of between 1 and 30 carbon atoms. Particularly preferred are primary monoamines such as laurylamine, stearylamine, octadecylamine, oleylamine and in general the primary monoamines with an aliphatic radical deriving from carboxylic acids such as the aforelisted.

Other polyoxyalkylenic compounds usable in the compositions of the present invention are the products obtainable by polyoxyalkylenation, particularly polyethoxylation, of mono- and poly-esters, in particular di-, tri- and hexa-esters of sorbitan and sorbitol, with saturated, unsaturated and polyunsaturated fatty acids with from 12 to 30 carbon atoms, such as lauric, myristic, palmitic, stearic or oleic acid, and with mixtures of such fatty acids directly obtainable by saponification of various vegetable and/or animal oils and fats. Polyethoxylated products of this type are known, for example, by the registered trademark TWEEN(®) of the Atlas Company and are commonly used as surfactants for various industrial uses. According to the present invention, analogous products deriving from polyoxyalkylenation, in particular polyethoxylation, of sorbitol and sorbitan esters with monocarboxylic acids, in particular aliphatic, with from 1 to 12 carbon atoms, are also suitable.

In the liquid catalyst C, the weight ratio of alkali metal halide to polyoxyalkylenic compound is between 1:2 and 1:20 and preferably between 1:3 and 1:10.

The solution of alkalimetal halide in the polyoxyalkylenic compound can be prepared by conventional mixing methods, possibly with the aid of a solvent or mixture of solvents subsequently eliminated by distillation. To facilitate the dissolution of the alkali metal halide, it may be necessary to apply mild heating. The dissolving operation is generally carried out at a temperature of between $-50°$ and $+100°$ C. and preferably between $-10°$ and $+45°$ C.

The alkali metal halide is usually and previously finely pulverized and dried in a hot oven, at best under vacuum. A similar dehydration operation is also similarly performed on the polyoxyalkylenic compound by methods well known in industry and in laboratory practice. For example, the compound can be dried by maintaining it under vacuum at a temperature of between 50° and 100° C., or by a suitable dehydrating agent (molecular sieves, anhydrous salts such as $CaSO_4$, $Na_2SO_4$, etc.), or by using more than one of the aforesaid method.

Simpler and more rapid solubilization can be achieved by gradually adding the halide to the polyoxyalkylenic compound pre-diluted in a suitable solvent under continuous stirring, until the salt is completely dissolved. For this operation it is advisable to use a closed vessel protected from moisture, and purged with a dry gas such as air, nitrogen or argon. To pre-dilute the polyoxyalkylenic compound, solvents or solvent mixtures can be used, preferably pre-dried, having good volatility below 100° C. Tetrahydrofuran, dioxane, 1,2-dimethoxyethane, di-isopropylether, tert-butylmethylether, dichloromethane, chloroform, acetone, methylethylketone, methanol, ethanol, isopropanol and their mixtures can, for example, be used. When dissolution is complete, the solvent is carefully removed by distillation, preferably under reduced pressure.

At less than 70° C., and preferably less than 20° C., the catalyst C is in the form of an oily liquid from colourless to pale yellow, and is easy to handle as it is of very low flammability, toxicity, hygroscopicity and corrosivity. It is perfectly soluble and easily dissolved at temperatures lower than 70° C. in the component A or B of the reactive composition of the present invention, and preferably in both if these components are liquid, and in any case in the A/B mixture, which is liquid at a temperature lower than 70° C.

This catalyst also has the advantage of not promoting premature chemical polymerization reactions of the component B, at least within a relatively long time at a temperature not exceeding 70° C. Consequently the catalyst can be previously dissolved in the component B, the resulting mixtures being stable and preservable at a temperature not exceeding 70° C. for a time sufficiently long for their subsequent use.

The catalyst C can be used as such or can be diluted with a suitable quantity of a liquid poly- or mono-epoxide chosen from those previously indicated as constituents of component B. The fact that the catalyst C is available in the form of a liquid makes preparation of the reactive composition operationally easier than in the known art in which solid catalysts are used, in that the catalyst can be fed and metered volumetrically as a separate component.

The component A, consisting of a polyisocyanate or a mixture of different polyisocyanates, and the component B, consisting of an epoxide or a mixture of different epoxides, as described heretofore, go together to constitute the liquid reactive composition of the present invention in quantities which can vary, but such that the ratio of the isocyanate groups to the epoxide groups is between 99:1 and 50:50, and preferably between 95:5 and 55:45. The A/B mixtures are liquid and preferably only slightly viscous at temperatures lower than 70° C., and in the absence of the catalyst C are stable for a relatively long time at temperatures both lower and higher than 70° C.

The liquid catalyst C is present in the reactive composition in such a quantity that the weight ratio of the alkali metal halide to the A/B mixture of polyisocyanates and epoxides is between 0.01:100 and 5:100, and preferably between 0.1:100 and 2.5:100. Through polymerization processes promoted by the catalyst C, the reactive compositions of the present invention are converted into a solid-glassy material with a high softening point, generally of between about 140° C. and about 300° C. Gelation and solidification occur spontaneously even from room temperature, and in any case between 0° and 70° C. within a very short time from mixing the components. The polymerization can then be completed by maintaining the material at an appropriately high temperature for a relatively short time. The possibility of accomplishing gelation and solidification at room temperature, or in any case between 0° and 70° C., has, inter alia, the advantage of not requiring the reactive composition to be strongly preheated, hence preventing during processing any excessive overheating of the polymer, of the parts or surfaces in contact with it and/or of additives and auxiliaries which may be contained within it. In this respect, it should be noted that the initial temperature is increased during processing by the heat due to the exothermic nature of the polymerization process. Gelation end subsequent hardening of the said compositions takes place in a shorter time the higher the working temperature used and the greater the quantity of catalyst C in the isocyanate/epoxide mixture are.

The reactive compositions of the present invention are therefore particularly suitable for use in all those non-continuous, and in particular continuous, processes for the rapid manufacture of finished or semi-finished articles, surface coatings, adhesives, sealants and foams of polymeric material which require rapid mixing of all the components followed by virtually immediate injection, casting, spreading or spraying into moulds, forms, shapes, substrates or miscellaneous objects, or extrusion through nozzles. In particular, these compositions are advantageously usable in said processes in combination with bands, pieces or strips of fibres and the like, which are rapidly impregnated by the compositions by virtue of their low viscosity.

Additives and auxiliaries or various associations thereof of known use to the expert in the field of plastic materials and thermosetting resins can be used as further components of the reactive compositions of the present invention. The purpose of adding these substances is to obtain a polymer with particular required final characteristics, or to better adapt the material to the working process to be used or to the specific type of application desired, or simply to reduce the material cost. Those additives, which can be used either alone or in mutual association, include mineral fillers such as kaolin, talc, calcium carbonate, dolomite, alumina, silica or glass in powder form, short or ground glass, carbon, asbestos and other fibres, white powdered pigments such as titanium dioxide, zinc oxide, barium carbonate and sulphate and others, black pigments such as carbon black, coloured pigments, lubricant powders such as graphite or molybdenum disulphide, inorganic flame retardants such as antimony trioxide, metal borates and phosphates, and organic flame retardants such as various organic polyhalogenated compounds, phosphates and phosphonates. Additives and auxiliaries usable in association with the previous ones and with each other include stabilizers, dyes, diluents, mould-release agents, thixotropic agents, antifoam agents, propellants, swelling agents, surfactants, wetting agents, emulsifiers and others of known use. Various methods can be used for preparing the liquid reactive compositions of the present invention, according to the type of process chosen for forming the finished or semi-finished articles, surface coatings, sealants or foams of polymeric material, and according to the intrinsic or desired gelation and hardening rate for the composition, i.e. the required rate of formation of the finished product.

It must be emphasized that the catalyst G offers considerable operating freedom in the method of working, both by virtue of the rapid and complete dissolution of the catalyst in the separate components A and B and in their A/B mixtures, and because of the good stability, even over long periods, of the mixtures formed by the catalyst and the component B at both below and above 70° C. The liquid reactive compositions of the present invention can be prepared with known devices by mixing simultaneously and continuously together the components A and B and the catalyst C, forced to flow in suitable quantity ratios and to converge to mix together over a very short period of time by passing through a suitable duct, cavity, nozzle or the like from which they flow continuously to be directly conveyed as a homogeneous liquid mixture into the appropriate line for the injection, casting, spreading or spraying of the composition.

The composition can be otherwise prepared entirely analogously by mixing continuously the component A with the previously prepared B/C mixture, or the catalyst G with the A/B mixture.

The optional additives and auxiliaries of the composition are preferably pre-dispersed homogeneously or pre-dissolved in the components A or B or in the B/C or A/B mixtures. It is also possible, particularly if using relatively slow non-continuous methods, such as casting into forms, to prepare the reactive composition portion by portion, by mixing all the components in a suitable container and then using the whole of the just prepared composition portion. This method is applicable to reactive compositions which polymerize over a sufficiently long period of time and/or by using a mixing and handling temperature sufficiently low to allow perfect homogenization of the components and to allow the liquid composition to be injected, cast , spread or sprayed before its gelation can take place.

After mixing, the reactive composition left at or adjusted to a temperature of between 0° and 70° C., or optionally higher, can be injected, drawn, cast, extruded, spread or sprayed in moulds or forms, or on shapes or various substrates, depending on the process used. Under these conditions the reactive composition gels and hardens spontaneously without the need for further external heating, to be transformed into a handleable solid polymer within a time generally between a few minutes and a few tens of minutes. This hardening time can be considerably reduced by heating the composition to a temperature exceeding 70° C. and/or by using particularly high catalyst G concentrations within the initially indicated range.

According to the present invention, the solid polymer obtained by rapid spontaneous hardening of the reactive composition, and optionally containing mineral fillers, fibres and/or other known additives or auxiliaries, is then advantageously subjected, possibly in a separate location, to heat treatment which advances and completes the polymerization, to raise its softening point, rigidity and/or toughness, hardness and insolubility to very high levels. This heat treatment of the already hardened reactive composition can be accomplished by maintaining the material at a temperature of between 50° and 280° C., and preferably between 100° and 250° C., for a time of between 0.5 and 24 hours and preferably between 0.5 and 6 hours. By suitable heat treatment, the polymeric material obtainable from the reactive composition of the invention can reach a softening point exceeding 250° C. and in general between 140° and 300° C., a considerable hardness, a high elastic modulus, and virtually complete insolubility. Other characteristics of the polymeric material obtainable from the composition of the invention, even without the presence of additives and auxiliaries, are low flammability and good self-extinguency, together with high adhesiveness to many substrates such as metals, glass and ceramics.

The liquid reactive compositions of the present invention are usable in a particularly advantageous manner for the rapid formation, by continuous or non-continuous processes, of finished or semi-finished articles of composite polymeric material having high heat distortion temperature and reinforced with long and/or continuous, rigid and/or resistant fibres, such as glass, carbon, polyamide, silicon carbide, boron, ceramic, metal or other known fibres or associations thereof, and/or with various metal or non-metal reinforcement structures or inserts, and for the rapid encapsulation or incorporation of various objects such as electrical, electronic or similar circuits or devices. Continuous bands, strips, mattings, fabrics, non-woven fabrics, preforms or other fibre aggregates or their associations, and various reinforcing structures or inserts of metal or other material, or various objects of various shapes and dimensions, can be wetted and impregnated with the liquid reactive composition and embedded in it. The reactive composition can then be left to harden rapidly and be then subjected to heat treatment as heretofore described.

The liquid reactive compositions of the present invention are particularly suitable for manufacturing finished articles of even considerable dimensions and/or large thickness by known methods such as Resin Transfer Moulding, High Speed Resin Transfer Moulding, Liquid Injection Moulding, Reaction Injection Moulding and the like, or by modifications of them. In these methods the composition, preferably left at or previously brought to a temperature of between 0° and 70° C., is rapidly injected or drawn into a closed mould at a temperature preferably within the same range, then left therein to polymerize and harden spontaneously without the need for external heating within a very short time not longer than a few tens of minutes, and then rapidly extracted from the mould in the form of a solid article. Mattings, fabrics, non-woven fabrics, preforms or other fibre aggregates and/or various metal or other reinforcing structures or inserts can be previously positioned in the forming mould, to be impregnated and incorporated by the liquid reactive composition during its injection and after polymerization form with it a reinforced composite polymer article.

The liquid reactive compositions of the present invention are also suitable, either associated or not associated with the aforesaid fibres or various reinforcing structures, for the rapid manufacture of finished or semi-finished articles of polymeric material by other non-continuous processes known in the thermosetting resin field. The reactive composition can for example be poured at atmospheric pressure or under vacuum into open forms or moulds, or spread or sprayed onto shapes, or fed into a mould and forced therein to assume its shape through a die, or fed into a form and forced to assume its shape by an elastic or otherwise deformable membrane drawn by sucking air and/or thrust by compressed gas, and then left therein to polymerize and harden at the aforesaid modest temperature and within the aforesaid short time interval.

Said compositions can also be used for the rapid continuous manufacture of semi-finished products such as structural sections, pipes, bars, slabs, panels and the like containing or not containing long or continuous reinforcing fibres or inserts of various kinds. The composition, prepared by continuous on-line mixing of its components, can be extruded or cast continuously together with or without fibre-formed tapes, strips, fabric, continuous non-woven fabrics or the like through nozzles of various shapes and left to polymerize and harden rapidly along the same production line.

The compositions of the present invention are also suitable for use for the rapid painting or coating, for example protective or decorative, of surfaces of various objects, and for rapid bonding of parts of articles, or for the rapid sealing of joints, gaps or interstices between different parts of manufactured articles. The liquid reactive composition can be prepared portion by portion or preferably by continuous mixing of its components on the production line and then virtually immediately spread, sprayed or injected onto the surfaces, joints, gaps or interstices to be treated and then left to rapidly harden. Especially for use as painting or coating, the reactive composition can comprise known diluents or solvents which reduce its viscosity and in particular those which can be subsequently eliminated by volatilization at suitable more or less elevated temperature.

Further uses for the reactive compositions of the present invention include the production of expanded and foamed polymeric products, formable in accordance with processes of the known art, by casting, spreading or injecting the compositions prepared in any manner and containing suitable expanding agents known in the industrial practice of the sector. The foaming of the reactive composition can be achieved virtually simultaneously at between 0° and 70° C., or optionally at a higher temperature, by a gas or vapour generated chemically or physically released in situ by a suitable expanding agent, with polymerization and cross-linking of the composition promoted by the catalyst C. Expanding agents of known use in the polyurethane material sector and introducible into said compositions include, inter alia, water, N,N'-dimethyl-N,N'-dinitroso-terephthalamide, chlorofluoroalkanes, dichloromethane, catalysts for forming carbodiimides with the release of carbon dioxide such as 1-ethyl-3-methyl-3-phospholene-1-oxide, or their combinations.

The present invention is further illustrated by the following examples, which are given by way of illustration and in no way limit the scope of protection of the invention.

EXAMPLE 1

408 g of polyoxyethyleneglycol of average molecular weight about 400, pre-dried over molecular sieves, plus 1 liter of anhydrous dichloromethane are placed in a five-necked flask of 2 liters capacity fitted with a mechanical stirrer, reflux condenser, thermometer, screw-type feed funnel for powders and an inlet feed tube for dry nitrogen, which is streamed, slowly during all the succession of operations. The temperature is then adjusted to and maintained at 20°-25° C. during the entire process. 92.5 g of powdered potassium iodide dried under vacuum at 40°-50° C. are then fed gradually into the flask under stirring. The mixture is stirred until it is clear. Most of the solvent is then removed from the resulting solution by distillation under atmospheric pressure at a temperature not exceeding 50°-60° C. The residual dichloromethane is then carefully eliminated with a rotary evaporator under reduced pressure and again at 50°-60° C. The catalyst prepared in this manner is a yellowish clear oily liquid at 15°-20° C. A reactive composition comprising this catalyst is used for the rapid formation of a polymeric sheet by injection into a closed mould.

Two steel vessels provided with a mechanical stirrer, purged with dry nitrogen and left at a room temperature of 18° C. are connected to a Venus EP03 machine for thermosetting resin injection and are fed respectively with:

1. a mixture consisting of: a) 15 parts by weight of the liquid catalyst prepared by the above process; b) 85 parts by weight of an epoxy resin mixture consisting almost entirely of the diglycidylether of bisphenol F and small quantities of its higher homologues, with an epoxy equivalent weight (determined by titration with hydrobromic acid in an anhydrous environment) of 168.5 and a viscosity of 3420 mPa.-sec at 25° C.;
2. "crude" MDI polyisocyanate with an isocyanate equivalent weight (determined by reaction with dibutylamine followed by potentiometric back titration with methanolic HCl) of 136.7 and a viscosity of 142 cPs at 20° C.

The liquid reactive composition is formed by feeding the machine mixing/injection gun with two streams from the vessels 1 and 2 in a volumetric ratio of 43:57. This mixture is injected at the room temperature of 18° C. into an aluminum mould with a rectangular inner cavity of dimensions 300×300×6.4 mm, without temperature control devices and also left at the said room temperature.

The mould is filled in 10 seconds. A solid polymeric sheet is extracted from the mould 5 minutes after the injection, and is baked in an oven for 30 minutes at 120° C., 1 hour at 180° C. and 2 hours at 200° C. The hard resistant polymer obtained in this manner has a glass transition temperature, determined by differential calorimetry at a scanning rate of 20° C./min, of about 220° C.

Rectangular bars obtained from the sheet are used to determine the following mechanical properties (in accordance with ASTM D-790):

| | |
|---|---|
| flexural elastic modulus: | 3.4 GPa (at 23° C.) |
| | 2.85 GPa (at 100° C.) |
| flexural strength: | 57 MPa (at 23° C.) |
| | 48 MPa (at 100° C.) |

EXAMPLE 2

A liquid catalyst is prepared by the method described in Example 1, using 48.2 g of potassium bromide, 402 g of polyoxyethyleneglycol of average molecular weight about 400, and 500 ml of dichloromethane. The catalyst prepared in this manner is in the form of a colourless transparent oil at 20°-25° C. A reactive liquid composition comprising this catalyst is used for the rapid formation of a flat composite polymeric sheet reinforced with glass fibres by the resin transfer moulding process. The two steel vessels connected to the Venus EP03 thermosetting resin injection machine of Example 1 are both temperature-controlled at a temperature of 50° C. and fed respectively with:

1. a mixture consisting of: a) 1 part by weight of the aforesaid catalyst; b) 6 parts by weight of an epoxy resin mixture consisting almost entirely of the diglycidylether of bisphenol A and small quantities of its higher homologues, with an epoxy equivalent weight of 177.6 and a viscosity of 8680 mPa.sec at 25° C.; p1 2. the same "crude" MDI polyisocyanate as used in Example 1. Three layers of glass fibre woven roving with a nominal average density of 400 g/m² are positioned in an aluminum mould with an internal rectangular cavity of dimensions 300×300×6.4 mm, provided with a heating/cooling coil using diathermic oil, preheated to 50° C. and placed between the surfaces of a hydraulic press. A liquid reactive composition is injected at 50° C. into this mould by using the machine mixing-/injection gun, the gun being provided with a tubular static mixer fed at a pressure of 4 bar with two streams, in a volumetric ratio of about 45:55, consisting of the epoxy resin/catalyst mixture of vessel 1 and the isocyanate of vessel 2 respectively.

The mould is filled in 20 seconds. A solid composite polymeric sheet is extracted from the opened mould 12 minutes after the injection. The sheet is post-cured in an oven for 30 minutes at 120° C., 1 hour at 180° C. and 2 hours at 220° C.

The sheet is then cut into rectangular bars, which are used to determine the characteristics of the material obtained, with the following results:
 a) glass fibre content, determined by weighing each bar before and after combustion in a muffle furnace at 600° C., of 16.3% by weight;
 b) softening point of about 240° C., determined by flexural dynamic-mechanical analysis on three points at a working frequency of 1 Hz, by using a Dynastat dynamic-mechanical analyzer;
 c) flexural elastic modulus at 23° C., determined by a dynamometer in accordance with ASTM D 790, of 5.1 GPa;
 d) flexural strength at 23° C., in accordance with ASTM D 790, of 185 MPa.

EXAMPLE 3

58 g of dry potassium iodide, 465 g of polyoxypropyleneglycol of average molecular weight about 425 and 200 ml of anhydrous dichloromethane are used to prepare a liquid catalyst by the method described in Example 1. The catalyst obtained is in the form of a clear pale yellow oil at 20° C. An isocyanic prepolymer, liquid at room temperature, is prepared by reacting for 3 hours at 80° C., in a flask fitted with a mechanical stirrer and purged with dry nitrogen, 156.0 g of a hydroxyl-bifunctional polyoxypropyleneglycol of average molecular weight 234, with 340.0 g of diphenylmethane-4,4'-isocyanate. The prepolymer prepared in this manner has an isocyanate group content, determined by titration, of 11.56 wt % and an isocyanate equivalent weight of 363.4.

The two vessels described in Example 1, connected to a Venus HIS 80-400/S.M. thermosetting resin injection machine and both temperature controlled at 50° C., are fed respectively with:
 1. a 38:31:31 weight mixture of the bisphenol A epoxy resin of Example 2. a "crude" MDI having an isocyanate equivalent weight of 134.5. and the aforedescribed prepolymer;
 2. the catalyst prepared in the aforedescribed manner.

As described in Example 1, a liquid reactive composition is formed by feeding the machine mixing-/injection gun with two streams consisting respectively of an epoxy resin/"crude" MDI/isocyanic prepolymer and the catalyst in a volumetric ratio of 71:8. The composition is directly injected into the mould described in Example 2 and preheated to 50° C. The injection time is 10 seconds. 17 minutes after injection, a solid polymeric sheet is extracted from the mould and is then baked in an oven for 2 hours at 100° C. and a further 2 hours at 140° C. The hard tough material obtained has a glass transition temperature, determined as in Example 1, of about 155° C.

EXAMPLE 4

76.2 g of polyoxyethyleneglycol of average molecular weight 400 and pre-dried over molecular sieves, 100 ml of anhydrous dichloromethane and 23.8 g of finely powdered sodium iodide are placed in a four-necked flask of 500 ml capacity kept immersed in a cold water bath and fitted with a mechanical stirrer, reflux condenser and an inlet feed tube for dry nitrogen, which is fed slowly during all the succession of operations, The mixture is left under stirring until it is clear, after which the dichloromethane is eliminated as described in Example 1. The catalyst obtained is a yellowish clear viscous liquid at 20° C.

A liquid reactive composition is prepared by mixing rapidly together at about 25° C., in the following order:
 210 g of a liquid mixture of MDI isomers of isocyanate equivalent weight 129.2 consisting mainly of diphenylmethane-4,4'-, -2,4'- and -2,2'-diisocyanate, these isomers being in the approximate ratio of 56:30:14;
 80 g of heat-dried dolomite powder;
 129.5 g of the bisphenol A epoxy resin of Example 2;
 10.15 g of the liquid catalyst prepared by the above process.

The liquid composition prepared in this manner is rapidly cast into a vertical aluminum flat mould with an inner cavity of dimensions 250×250×4.5 mm preheated to 60° C. 9 minutes after having completed the filling, the mould is opened and an opaque glassy polymeric sheet of slight straw colour is extracted. The sheet is then baked in an oven for 30 minutes at 120° C., 1 hour at 180° C. and 4 hours at 220° C. The hard tough sheet has a softening point of about 250° C.

EXAMPLE 5

A liquid catalyst is prepared by the method of Example 1, using 115 g of potassium iodide, 385 g of polyoxyethyleneglycol-monomethylether of average molecular weight about 550, and 155 ml of dichloromethane. The resulting yellowish oily liquid is used as in Example 2 instead of the catalyst used therein, but with a catalyst/epoxy resin ratio of 1:9 by weight.

The vessels and the forming mould are temperature controlled at 60° C. and the mould is opened 20 minutes after having completed the injection of the liquid reactive composition. The composite material sheet obtained is post-cured for 30 minutes at 120° C., 1 hour at 180° C. and 4 hours at 200° C.

The sheet is then cut into bars, used to determine the material characteristics as in Example 2:
 a) glass fibre content of 17.2 wt %;
 b) softening point of about 220° C.;
 c) flexural elastic modulus and flexural strength at 23° C., of 5.2 GPa and 192 MPa respectively.

EXAMPLE 6

15.0 g of dry rubidium iodide, 46.0 g of polyoxyethyleneglycol of average molecular weight about 600 and pre-dried over molecular sieves, and 20 ml of dichloromethane are used to prepare a liquid catalyst by the method described in Example 4, using a flask of 250 ml capacity. The catalyst obtained is a clear yellowish oil at 20° C.

A liquid reactive composition is prepared by mixing together rapidly at 25° C.:
  166 g of the "crude" MDI polyisocyanate used in Example 1;
  166 g of the bisphenol A epoxy resin used in Example 2;
  18.6 g of the aforedescribed liquid catalyst.

The composition prepared in this manner is used to form a flat polymeric sheet as described in Example 4, by preheating the mould to 50° C. A solid sheet is extracted from the mould about 15 minutes after its filling. The sheet is baked in an oven on an aluminum shelf for 2 hours at 100° C. 2 hours at 140° C. and 30 minutes at 240° C. The hard and tough sheet material has a glass transition temperature of about 145° C.

EXAMPLE 7

A liquid catalyst is prepared as described in Example 6 from 6.35 g of cesium bromide, 43.7 g of polyoxyethyleneglycol of average molecular weight about 400, and 10 ml of dichloromethane. The catalyst is a clear colourless liquid at room temperature.

A reactive composition is prepared by mixing together rapidly at 22° C.:
  28.3 g of the "crude" MDI used in Example 1;
  17.4 g of the epoxy resin used in Example 2;
  4.37 g of the aforedescribed catalyst.

10 g of this liquid composition are put into a cylindrical aluminum capsule of 50 mm diameter, which is then rapidly heated to 50° C. in a circulating air oven. The composition gels in about 3.5 minutes and vitrifies after about a further 7.5 minutes. The resultant glassy polymer disc is then maintained at 120° C. for 30 minutes, at 180° C. for 1 hour and at 210° C. for 2 hours. The glass transition temperature of the material, determined as indicated in Example 1, is about 225° C.

EXAMPLE 8

88 g of dried, finely powdered potassium iodide, 412 g of polyoxyethylene-20-sorbitan-monolaurate (TWEEN ® 20, Atlas Co.) predried over molecular sieves and 180 ml of dichloromethane ere used to prepare a catalyst by the method described in Example 1. The catalyst obtained in this manner is a clear yellowish liquid of honey consistency at 20°-25° C.

A liquid reactive composition comprising this catalyst is used to prepare a flat composite glass fibre-reinforced polymeric sheet by Resin Transfer Moulding using the forming mould and resin injection machine described in Example 2.

The two machine vessels, temperature-controlled at 25° C. and 80° C. respectively, are fed as follows:
1. the vessel at 25° C. with the "crude" MDI of Example 3;
2. the vessel at 80° C. with a mixture of the bisphenol A epoxy resin of Example 2 and the aforedescribed catalyst, in a weight ratio of 87.5:12.5.

Four layers of chopped glass fibre mat with an average nominal density of 450 g/m² are placed in the described mould, which is maintained at 60° C.

A reactive composition is formed and injected into the mould by pumping two streams of polyisocyanate and of epoxy resin/catalyst mixture from the two vessels in a volumetric ratio of 58:42. The mould is filled in 20 seconds. 12 minutes after the injection a solid sheet is extracted from the mould and baked for 30 minutes at 120° C., 1 hour at 180° C. and 4 hours at 210° C.

Rectangular bars are formed from the composite polymeric sheet and are used to determine the material characteristics as indicated in Example 2:
  a) glass fibre content of 19.6 wt %;
  b) softening point of about 235° C.;
  c) flexural elastic modulus 4.9 GPa.

EXAMPLE 9

A liquid catalyst is prepared as described in Example 6, using 12.3 g of dry rubidium iodide, 68.0 g of polyethoxilated octylphenol with 10 moles of ethylene oxide per mole of octylphenol (produced by Rohm & Haas, marketed as Triton ®X 100, pre-dried over molecular sieves) and 15 ml of dichloromethane. The catalyst prepared in this manner is a straw-yellow oily liquid at 20° C. A liquid reactive composition is prepared by mixing rapidly together at 20° C.:
  289 g of the MDI liquid diisocyanate isomer mixture used in Example 4;
  61.5 g of 1,4-diglycidoxybutane;
  28.2 g of the aforedescribed catalyst.

The composition prepared in this manner is rapidly cast into the vertical flat mould of Example 4 preheated to 50° C. About 7 minutes after filling, a transparent straw-yellow glassy polymeric sheet is extracted from the mould. The sheet is baked in an oven for 30 minutes at 120° C., 3 hours at 180° C. and 3 hours at 190° C. The hard tough straw-yellow material has a glass transition temperature of about 220° C.

We claim:
1. A reactive composition liquid at a temperature lower than 70° C., comprising:
  A) at least one organic polyisocyanate;
  B) a mono- or polyepoxide, or a mixture of different mono- and/or polyepoxides, the ratio of isocyanate groups to epoxy groups in components A and B ranging from 99:1 to 50:50;
  C) a catalyst, liquid at a temperature of less than 70° C., consisting of a solution of at least one alkali metal halide in a polyoxyalkylenic compound or in a mixture of different polyoxyalkylenic compounds, said polyoxyalkylenic compound containing at least one alcohol hydroxyl group wherein the weight ratio of alkali metal compound to polyoxyalkylenic compound ranges from 1:2 to 1:20 and wherein the weight ratio of the alkali metal halide to the mixture of A and B components ranges from 0.01:100 to 5:100.

2. A reactive composition as claimed in claim 1, wherein the halide is a bromide or iodide.

3. A reactive composition as claimed in claim 1 or 2, wherein the alkali metal is selected from the group consisting of sodium, potassium, rubidium and cesium.

4. A reactive composition as claimed in claim 1, wherein the polyoxyalkylenic compound or the mixture of different polyoxyalkylenic compounds is liquid at a temperature of between −50° and 70° C.

5. A reactive composition as claimed in claim 4, wherein the polyoxyalkylenic compound or the mixture of different polyoxyalkylenic compounds is liquid at a temperature of between −10° and 25° C.

6. A reactive composition as claimed in claim 4 or 5, wherein the polyoxyalkylenic compound comprises repetitive oxyalkylene units containing from 2 to 4 carbon atoms and forming homopolyoxyalkylene or copolyoxyalkylene structures in which the various units ace distributed randomly or in blocks.

7. A reactive composition as claimed in claim 6, wherein the repetitive oxyalkylene units are selected from the group consisting of:

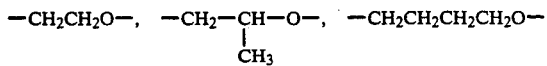

8. A reactive composition as claimed in claim 7, wherein the polyoxyalkylenic compound is selected from the group consisting of polyoxyethylene glycols of average molecular weight between about 150 and 10000, polyoxypropylene glycols of average molecular weight between about 200 and 6000, and polyoxytetramethylene glycols of average molecular weight between about 200 and 3000.

9. A reactive composition as claimed in claim 4, 5, 7 or 8, wherein the polyoxyalkylenic compound is obtained by polyalkoxylation or copolyalkoxylation of functional compounds containing one or more groups selected from the group consisting of alcoholic or phenolic hydroxyls, carboxyl groups, primary or secondary amide groups of carboxylic acids, and primary or secondary amine groups.

10. A reactive composition as claimed in claim 9, wherein the polyoxyalkylenic compound is obtained by polyethoxylation of said functional compounds and contains from 3 to 200 oxyethylenic units per molecule.

11. A reactive composition as claimed in claim 9, wherein the polyoxyalkylenic compound is obtained by polypropoxylation of said functional compounds and contains from 3 to 100 oxypropylene units per molecule.

12. A reactive composition as claimed in claim 9, wherein the polyoxyalkylenic compound is obtained by polyethoxylation followed by polypropoxylation of said functional compounds and contains from 3 to 150 oxyalkylene units per molecule.

13. A reactive composition as claimed in claim 1, wherein in the catalyst C the weight ratio of the alkali metal halide to the polyoxyalkylenic compound is between 1:3 and 1:10.

14. A reactive composition as claimed in claim 1, wherein the component A is an organic polyisocyanate or a mixture of organic polyisocyanates of formula $Q(NCO)_m$, where m is an integer number greater than 1, and Q is an m-valent $C_6$-$C_{24}$ organic radical selected from the group consisting of aliphatic, cycloaliphatic, aromatic, heterocyclic or mixed aliphatic, cycloaliphatic, aromatic and heterocyclic.

15. A reactive composition as claimed in claim 14, wherein m is 2, 3 or 4.

16. A reactive composition as claimed in claim 14 or 15, wherein the component A is an aromatic polyisocyanate or a mixture of aromatic polyisocyanates.

17. A reactive compositions as claimed in claim 16, wherein the component A is an isocyanate adduct, or a mixture of isocyanate adducts, obtainable by reacting one mole of at least one $C_2$-$C_{30}$ polyol containing p alcoholic hydroxyls, where p is 2, 3 or 4, with p moles of at least one aromatic polyisocyanate containing m isocyanate groups, where m is an integer number greater than 1.

18. A reactive compositions as claimed in claim 16, wherein the component A is an isocyanate prepolymer or a mixture of isocyanate prepolymers obtainable by reacting at least one aromatic polyisocyanate with at least one polymeric polyol of average molecular weight preferably between 200 and 15,000, in quantities such that the molar ratio of the isocyanate groups to the alcoholic hydroxyl groups is equal to or greater than 2.

19. A reactive composition as claimed in claim 1, wherein the ratio of the isocyanate groups of component A to the epoxide groups of component B is between 95:5 and 55:45.

20. A reactive composition as claimed in claim 1, wherein at least one of the components A and B and their mixture are liquid at a temperature of less than 70° C.

21. A reactive composition as claimed in claim 1, wherein the catalyst C is present in such a quantity that the weight ratio of the alkali metal halide to the A/B mixture of polyisocyanates and epoxides is between 0.1:100 and 2.5:100.

22. A reactive compositions as claimed in claim 1, which additionally contain a fourth component chosen from mineral fillers, short or ground fibres, pigments, diluents, stabilizers, flame retardants, thixotropic agents, lubricants, mould-release agents, antifoam agents, propellants, swelling agents, surfactants, wetting agents, emulsifiers and possibly other known additives or auxiliaries or associations thereof.

23. A reactive composition liquid at a temperature lower than 70° C., comprising:
   A) MDI polyisocyanate;
   B) an epoxy resin mixture consisting essentially of the diglycidylether of bisphenol F the ratio of isocyanate groups to epoxy groups in components A and B ranging from 99:1 to 50:1; and
   C) a catalyst of potassium iodide in polyoxyethylene glycol having an average molecular weight of about 400 wherein the weight ratio of potassium iodide to polyoxyethylene glycol ranges from 1:2 to 1:20 and wherein the weight ratio of the potassium iodide to the mixture of A and B components ranges from 0.01:100 to 5:100.

* * * * *

UNITED STATES PATENT AND TRADEMARK OFFICE
CERTIFICATE OF CORRECTION

PATENT NO. : 5,326,833
DATED : July 5, 1994
INVENTOR(S) : Fabrizio PARODI, et al.

It is certified that error appears in the above-indentified patent and that said Letters Patent is hereby corrected as shown below:

On the title page, Item [75], the 1st inventor's city should read as follows:

--Genova--

Signed and Sealed this

Twentieth Day of September, 1994

Attest:

BRUCE LEHMAN

*Attesting Officer*   *Commissioner of Patents and Trademarks*